United States Patent [19]

Leitgeb et al.

[11] Patent Number: 4,640,694
[45] Date of Patent: Feb. 3, 1987

[54] ADSORPTION PROCESS

[75] Inventors: Paul Leitgeb, Munich; Johann Leis, Egling; Dietmar Winkler, Munich, all of Fed. Rep. of Germany

[73] Assignee: Linde Aktiengesellschaft, Wiesbaden, Fed. Rep. of Germany

[21] Appl. No.: 668,370

[22] PCT Filed: Feb. 24, 1983

[86] PCT No.: PCT/EP83/00048
§ 371 Date: Nov. 27, 1984
§ 102(e) Date: Nov. 27, 1984

[87] PCT Pub. No.: WO84/03231
PCT Pub. Date: Aug. 30, 1984

[30] Foreign Application Priority Data
Aug. 19, 1981 [DE] Fed. Rep. of Germany ....... 3132758

[51] Int. Cl.[4] ............................................. B01D 53/04
[52] U.S. Cl. ............................................ 55/26; 55/62; 55/68; 55/75; 55/387
[58] Field of Search ................... 55/25, 26, 31, 33, 35, 55/58, 62, 68, 75, 163, 179, 387, 389

[56] References Cited

U.S. PATENT DOCUMENTS

| | | |
|---|---|---|
| 3,620,685 | 11/1971 | Rogers et al. . |
| 3,923,477 | 12/1975 | Armond et al. ............. 55/25 |
| 4,144,038 | 3/1979 | Armond ...................... 55/58 |
| 4,168,149 | 9/1979 | Armond et al. ............ 55/58 X |
| 4,194,892 | 3/1980 | Jones et al. ................. 55/68 X |
| 4,259,091 | 3/1981 | Benkmann ................. 55/25 |
| 4,280,824 | 7/1981 | Lassmann et al. .......... 55/26 |
| 4,315,759 | 2/1982 | Benkmann ................. 55/25 X |
| 4,326,858 | 4/1982 | Benkmann ................. 55/26 |
| 4,340,398 | 7/1982 | Doshi et al. ............... 55/58 X |
| 4,371,380 | 2/1983 | Benkmann ................. 55/26 |
| 4,402,712 | 9/1983 | Benkmann ................. 55/26 |
| 4,428,372 | 1/1984 | Beysel et al. ............. 55/25 X |
| 4,431,432 | 2/1984 | Amitani et al. ........... 55/58 X |
| 4,475,929 | 10/1984 | Fuderer .................... 55/25 |
| 4,496,376 | 1/1985 | Hradek ..................... 55/163 |

FOREIGN PATENT DOCUMENTS

| | | |
|---|---|---|
| 23679 | 2/1981 | European Pat. Off. . |
| 1769936 | 12/1970 | Fed. Rep. of Germany . |
| 2702785 | 7/1978 | Fed. Rep. of Germany . |
| 2724763 | 12/1978 | Fed. Rep. of Germany . |
| 2823211 | 12/1979 | Fed. Rep. of Germany ......... 55/26 |
| 2904539 | 8/1980 | Fed. Rep. of Germany . |
| 3150690 | 7/1982 | Fed. Rep. of Germany . |
| 2322649 | 4/1977 | France . |
| 2082082 | 3/1982 | United Kingdom . |

Primary Examiner—Robert Spitzer
Attorney, Agent, or Firm—Millen & White

[57] ABSTRACT

A pressure swing adsorption process is suggested conducted with three adsorbers. Cocurrent expansion gas obtained after termination of the adsorption phase is utilized initially for scavenging another adsorber. Additional cocurrent expansion gas serves for pressure buildup in the scavenged adsorber. Whereas this first pressure buildup is performed preferably in the adsorption direction, the subsequent pressurizing to adsorption pressure is conducted with the use of product gas in countercurrent mode. Furthermore, a special adsorber construction is proposed.

18 Claims, 3 Drawing Figures

ADSORPTION PROCESS

BACKGROUND OF THE INVENTION

The invention concerns a process for fractionation of a gaseous mixture according to the pressure swing adsorption process wherein a gaseous mixture under elevated pressure is conducted in cyclic alternation through three adsorbers filled with an adsorbent, with selective adsorption of at least one first component and formation of a product gas depleted of first component, each adsorber passing through chronologically mutually shifted switching cycles, and each switching cycle comprising an adsorption phase at maximum process pressure, expansion phases conducted first cocurrently and then countercurrently to the adsorption direction, a desorption phase at minimum process pressure, and pressure buildup phases for restoring the adsorption pressure; and wherein pressure equalization takes place between an adsorber in a cocurrent expansion phase and an adsorber in a pressure buildup phase.

Such a process has been known from DOS No. 2,724,763. In this reference, a pressure swing adsorption installation has been disclosed which is operated with three adsorbers, each adsorber being associated with a purifying bed arranged upstream thereof. In the purifying bed, with the aid of an adsorbent, the components are separated from the gaseous mixture to be purified or fractionated that could lead to problems in the primary adsorber, especially because they are strongly bound by the adsorbent and can be separated again only with difficulties. Preliminary purification is particularly advantageous, for example, in the treatment of gases which contain water vapor and carbon dioxide, such as air, steam reforming gas, synthesis gas, etc., on zeolitic adsorbents inasmuch as the aforementioned impurities are very strongly adsorbed on zeolites and should be kept away from the latter as much as possible.

In the conventional method, each adsorber and the associated purifying bed pass through the same cycle. Preferably, both components are even arranged in a single adsorption vessel. Following a desorption phase, conducted in this process by evacuating to subatmospheric pressure, an expansion gas obtained during the cocurrent expansion enters the adsorber between the purifying bed and the primary adsorber, in order to effect a first pressure buildup phase. A portion of this gas enters the purifying bed countercurrently to the adsorption direction and thereby urges the otherwise advancing front of the bed still further back toward the inlet side whereas the remainder is introduced into the primary adsorber in cocurrent fashion.

The pressure buildup by an expansion gas fed cocurrently is considered especially advantageous, since it is unnecessary to provide a high purity of the expansion gas. For this reason, the adsorbers can also be loaded, during an adsorption phase, up to the breakthrough of the component to be adsorbed or of the components to be adsorbed, respectively. In case of breakthrough of the adsorption front, the provision is made that the product gas, withdrawn in the impure state in such a case, is conducted through still another, previously repressurized, adsorber and is purified therein. In this operating phase, two adsorbers are thus connected in series.

Following the first pressure buildup phase, another pressure increase takes place to the adsorption pressure by introducing crude gas introduced into the purifying bed cocurrently to the adsorption direction. Therefore, this gas first passes through the purifying bed and then enters the primary adsorber.

One drawback of the conventional process is to be seen in that satisfactory product yields can be achieved only by conducting desorption at subatmospheric pressure. The vacuum pump required to produce the vacuum represents, however, a significant cost factor within the adsorption plant which makes itself felt not only as an initial investment but also during operation in the form of energy, servicing, and repair expenses.

SUMMARY OF THE INVENTION

Therefore, tne invention is based on the object of designing a process of the type discussed hereinabove in such a way that satisfactory product yields are obtained even if the desorption is not conducted under less than atmospheric pressure.

This object is attained by providing that, after termination of the adsorption phase of a first adsorber, a first cocurrent expansion phase follows, and the thus-obtained expansion gas is utilized for scavenging a second adsorber which is in a desorption phase; that thereafter a second cocurrent expansion phase follows and the thus-obtained expansion gas is utilized for pressurizing the second adsorber; that thereafter countercurrent expansion follows during which a residual gas is withdrawn from the inlet end of the first adsorber; that then the desorption phase follows during which scavenging is carried out with a first cocurrent expansion gas from the third adsorber; and that finally two pressure buildup phases follow, of which the first takes place in pressure equalization with the third adsorber which is in the second cocurrent expansion phase and the second one takes place by introduction of product gas by way of the outlet end of the adsorber.

The process of this invention involves a special combination of a series of individual measures, the performance of which leads to surprisingly high product yields. The yields lie substantially above those attainable by the known process discussed above, if the limiting conditions for both processes are chosen to be the same, and desorption is carried out without production of a subatmospheric pressure.

Preferably, the adsorption phase in the process of this invention is conducted under essentially constant pressure. However, minor pressure fluctuations can occur if, besides the product gas, additional gas is withdrawn from an adsorber in an adsorption phase in order to pressurize a further adsorber which latter is in its second pressure buildup phase. Also, after switchover of an adsorber pressurized with product gas to adsorption operation, a small pressure increase will, conversely, result, since, with a constant feeding of the gaseous mixture to be fractionated or to be purified into the adsorption installation, only product gas is being withdrawn at this point in time at the outlet end of the adsorber.

A throughflow phase exists for the adsorber that is in an adsorption phase; i.e., gaseous mixture is supplied via the inlet end and simultaneously product gas is discharged from the outlet end. During the adsorption phase, the adsorption front is shifted in the direction toward the outlet end of the adsorber. The adsorption phase is terminated before the adsorber has been completely loaded, i.e. before the adsorption front has reached the outlet end. Thereby, still a load-free zone remains in the area of the outlet end, into which zone the adsorption front is further advanced during the subsequent cocurrent expansion phase. Preferably, breakthrough at the outlet end is avoided during this step, because in such case a gas can be withdrawn even during these phases which is extensively depleted of the component to be adsorbed.

After termination of the adsorption phase, a cocurrent expansion gas is withdrawn, the composition of which still corresponds extensively to that of the product gas and which contains larger proportions of the components to be adsorbed only with increasing pressure drop. The expansion gas, initially obtained in the highest pressure range, the composition of which comes closest to that of the product gas, is utilized for scavenging another adsorber passing through a desorption phase at that time. The use of this qualitatively satisfactory expansion gas for scavenging purposes makes it possible to effect desorption with relatively small amounts of scavenging gas. The loss in product yield, always accompanying a scavenging step, is thereby kept at a low level.

After completion of the scavenging procedure, additionally obtained cocurrent expansion gas is utilized for pressurizing the previously scavenged adsorber to an intermediate pressure. This gas, which usually contains only low proportions of adsorbate, can be introduced into the adsorber to be pressurized via the outlet end as well as via the inlet end. Raising the pressure by way of the outlet end is advantageous insofar as thereby the adsorption front, pushed back toward the inlet end during scavenging, is still further pushed back. However, this favorable effect may be confronted by the disadvantage that the outlet end of the adsorber is contaminated by small amounts of components to be adsorbed. Since these components are readily entrained out of the adsorber during the next adsorption phase, a lower product purity must in some cases be expected.

Therefore, in a preferred embodiment of the invention, this pressure equalization between the adsorber to be expanded and the adsorber to be pressurized is performed by introducing the expansion gas into the adsorber to be pressurized by way of the inlet end. As has been discovered, this not only improves product purity but also product yield.

Subsequently to the pressure buildup with cocurrent expansion gas, the adsorber is pressurized with product gas. Feeding of the product gas takes place via the outlet end whereby the residual load remaining in the adsorber is shifted toward the inlet end without having to fear simultaneously a contamination of the outlet end.

Customarily, countercurrent expansion gas, obtained after terminating the cocurrent expansion phase under a low pressure and containing an increased proportion of desorbed components, is discharged as residual gas, optionally together with the desorbate-containing scavenging gas produced during the scavenging step.

An embodiment of the invention wherein the adsorbers utilized are constructed so that the flow cross section within the adsorber is reduced toward the gas outlet end has proven to be particularly advantageous. This objective can be achieved from a structural viewpoint in many ways, for example with the aid of staggered or conically tapering adsorbers, by baffles within a cylindrical adsorber vessel, or by the arrangement of displacement members within the adsorber packing with a uniform cross section, or with a cross section increasing toward the outlet end.

A considerable advantage of the reduction in flow cross section is to be seen in that the flow rate of the gas to be fractionated is increased in this way. This is of advantage, in particular, in case a considerable proportion of the gaseous mixture to be fractionated is adsorbed, since then only a fraction of the gaseous mixture fed to the adsorber will flow all the way to the outlet end thereof (thus, for example, in air fractionation by adsorption of nitrogen, only an oxygen proportion amounting to about 21% by volume of the entering raw air will be passed through to the outlet end of the adsorber). The reduced flow rate caused by the decreased amount of gas has, in many instances, an unfavorable effect on the formation and/or progression of the adsorption front.

These disadvantages can be avoided by constricting the flow cross section, in accordance with this invention, by 10–80%, especially 40–60%. In this connection, the question of how much the flow cross section is to be reduced must be determined by customary optimization calculations, considering the specific gaseous mixtures to be fractionated and the properties of the adsorbent employed, and additional limiting conditions.

The constriction of the flow cross section can be effected within wide ranges of the adsorber packing, for example over 20–80%, especially over 30–50% of the adsorber length. The cross-sectional reduction should be extended toward the outlet end of the adsorber at least to such a degree as the adsorption front progresses during an adsorption phase.

An especially advantageous adsorber construction consists of a cylindrical vessel with a packing of adsorption material and with a gas inlet end, as well as a gas outlet end at the opposed ends of the vessel, there being arranged an adsorbent-filled displacement member in the zone of the gas outlet end, this member being essentially axially aligned and open at its end oriented toward the gas outlet end of the vessel as well as closed at its end oriented toward the gas inlet end of the vessel; at this closed end, the member is in communication with a conduit leading out of the vessel. Through this conduit, in an advantageous fashion, expansion gases can be withdrawn from the adsorber or scavenging gases and/or pressurizing gases can be introduced into the adsorber, separately from the product discharge conduit at the gas outlet end of the adsorber.

In an advantageous further development of the construction of this invention, the displacement member is a unilaterally open pipe, arranged concentrically within the vessel, the length of this pipe being between 20% and 80% of the length of the adsorbent packing, and the open end of this pipe having a spacing from the outlet end of the adsorbent packing of between 5% and 30%, especially between 8% and 15%, of the length of the adsorbent packing. The cross section of such a pipe is advantageously between 10% and 80% of the vessel cross section, for example between 30% and 50% of the vessel cross section.

The process of this invention can be utilized with conventional adsorbers or with adsorbers designed according to this invention in a large number of fractionation or purification processes. Suitable fields of application are, inter alia, air fractionation, the fractionation of steam reforming gas or synthesis gas, the purification of raw hydrogen, or the separation of gaseous hydrocarbon mixtures. On account of the use of merely three adsorbers, the process is particularly suitable for the treatment of relatively small gas quantities, as they are required, for example, in air fractionation for the production of oxygen or of oxygen-enriched air for wastewater treatment according to the activated sludge method.

All of the conventional adsorbents are suited for conducting the process of this invention, thus, for example, activated carbon, silica gel, alumina gel, or molecular sieves. The choice of the specific adsorbent depends, in essence, only on the type of the gas to be treated in a particular case, and on the components to be separated.

BRIEF DESCRIPTION OF THE DRAWINGS

Additional details of the invention will be described below with reference to an embodiment shown schematically in the figures.

In the drawings.

DETAILED DESCRIPTION OF THE DRAWINGS

Figure 1:
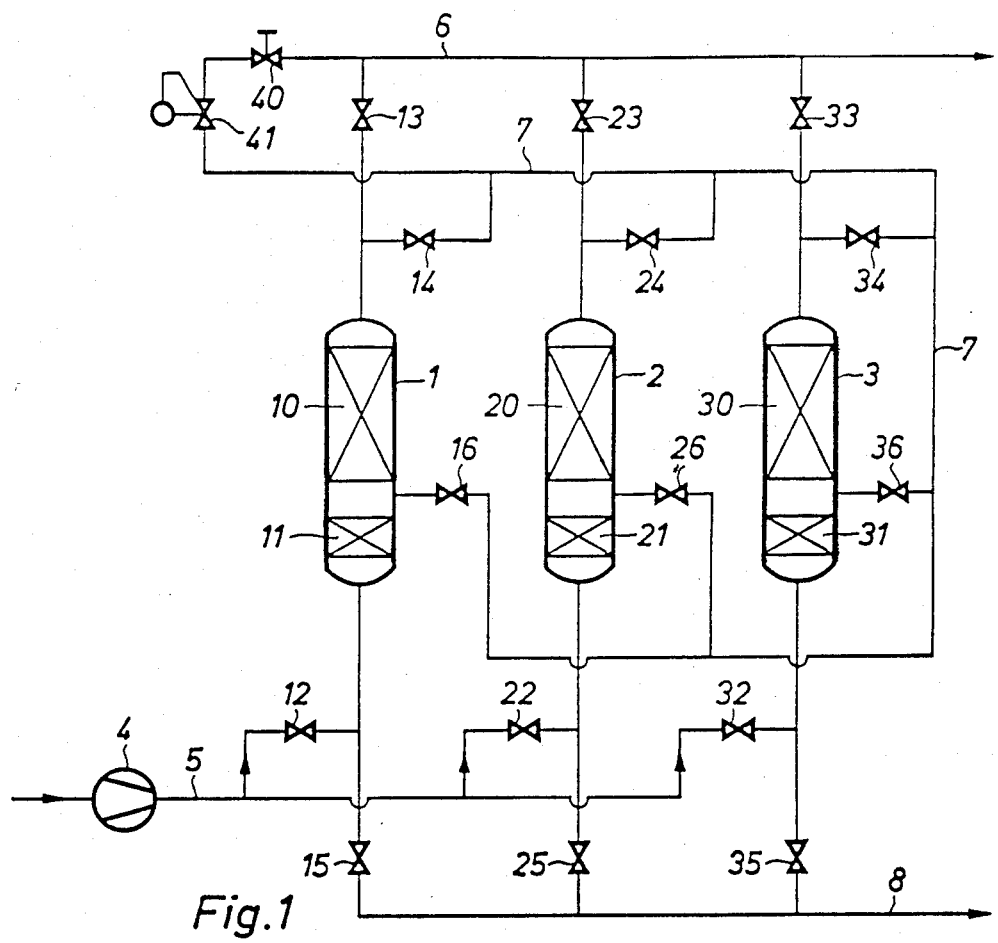
FIG. 1 shows an adsorption installation suitable for conducting the process of this invention.

The installation shown in FIG. 1 consists of three adsorbers 1, 2 and 3 which comprise adsorption beds 10, 20 and 30 and purifying beds 11, 21 and 31 upstream thereof. In the latter, components present in the gaseous mixture to be fractionated and liable to be troublesome in the actual adsorption bed due to strong adsorption and poor regeneration ability are separated from the gaseous mixture. Such components, when using zeolitic molecular sieves as the adsorbent, are, for example, steam or carbon dioxide. The purifying beds and the adsorption beds are accommodated in this case in an adsorber vessel common to both of them, so that the two mutually associated beds are respectively in an identical operating phase.

In a compressor 4, the gaseous mixture to be purified or fractionated is compressed to the pressure necessary for the adsorption and conducted via a conduit 5 and a valve 12 to the purifying bed 11 of adsorber 1, where interfering components, such as steam, carbon dioxide, and in some cases other components are separated. The thus preliminarily purified gas enters immediately thereafter the adsorption bed 10 of adsorber 1 where one or more components of the gaseous mixture are adsorbed with preference. The product gas, freed of these components, is discharged through a valve 13 and a product gas conduit 6.

The adsorption phase of adsorber 1 is terminated before the adsorption front of the preferably adsorbed component has reached the end of the adsorption bed 10 of adsorber 1. However, beforehand, a partial stream of the product gas is already branched off by opening valves 40 and 41 and is passed on via conduit 7 and the opened valve 24 to adsorber 2, which latter is pressurized by this gas countercurrently to the adsorption direction. The valves 22, 23, 25 and 26, associated with the adsorber 2, are closed during this phase. Since the gaseous stream fed into adsorber 1 via the opened valve 12 remains constant with respect to time, a minor pressure drop takes place after opening valves 40 and 41, as, simultaneously, product gas is withdrawn via conduit 6 and pressurizing gas is discharged via conduit 7. The thus-occurring pressure drop can range, for example in case of an adsorption pressure of about 4 bar, on the order of 0.5–0.7 bar.

The instant of opening valves 40 and 41 is chosen so that the adsorber 2 is pressurized once the adsorption phase of adsorber 1 is finished. Then, valves 12, 13, 40 and 41 are closed, and the crude gas is conducted, by opening valves 22 and 23, through the purifying bed 21 and the adsorption bed 20 of adsorber 2 where the adsorption step is repeated in the same way as it took place previously in adsorber 1.

The adsorber 1 is now expanded in cocurrent fashion. Since the adsorption phase is finished before the adsorption front has reached the outlet end of the adsorption bed 10, a cocurrent expansion gas enters, via valve 14 which is open at this point in time, the conduit 7, the composition of this gas corresponding extensively with that of the product gas. The gas obtained in a first cocurrent expansion phase is conducted via the opened valve 34 to the outlet side of the adsorber 3. After expansion in valve 34 to the lowest process pressure, preferably to atmospheric pressure, this cocurrent expansion gas flows through adsorber 3 countercurrently to the adsorption direction; during this step, the components adsorbed in a preceding adsorption phase are desorbed and flushed out of the adsorber 3. The desorbate-containing residual gas is conducted via the opened valve 35 to the residual gas conduit 8 and removed from the installation.

After termination of the scavenging phase, cocurrent expansion gas continues to be withdrawn via the opened valve 14 from adsorber 1. This gas is employed for pressurizing the adsorber 3 in a first pressure buildup phase. For this purpose, the previously opened valves 34 and 35 are closed, and valve 36 is opened, whereby the expansion gas enters, cocurrently to the adsorption direction, the adsorption bed 30 of adsorber 3. The expansion gas conducted via the opened valve 36 into adsorber 3 enters between the purifying bed 31 and the adsorption bed 30. Thus, as far as the purification bed 31 is concerned, this pressure buildup phase takes place countercurrently to the adsorption direction. This has the effect that any residual charge which may still remain thereat after desorption will be pushed back in the direction toward the inlet end of the purifying bed whereby the effectiveness of the preceding desorption is still further enhanced; in the final analysis, this leads to a reduction in size of the purifying bed.

The cocurrent expansion phases of adsorber 1 are finished once the adsorption front has reached the outlet end of adsorber 1. Then an expansion phase takes place countercurrently to the adsorption direction. For this purpose, the valve 14 is closed and the valve 15 is opened whereby communication is established with the residual gas conduit 8. After expansion has taken place down to atmospheric pressure, the desorption or scavenging phase follows for adsorber 1. To this end, cocurrent expansion gas from adsorber 2, just finished with its adsorption phase, is conducted into adsorber 1 countercurrently to the adsorption direction via the opened valve 24, conduit 7, and the likewise opened valve 14. After termination of the desorption phase, the adsorber 1 is again pressurized in two stages to adsorption pressure. In a first pressure buildup phase, cocurrent expansion gas from adsorber 2, in its second cocurrent expansion phase, is utilized for this purpose. During this step, adsorber 2 discharges cocurrent expansion gas via the further open valve 24; this gas is injected into adsorber 1 by way of the presently open valve 16 between the purifying bed 11 and the adsorption bed 10. The previously open valves 14 and 15 are closed during this phase.

After pressure equalization has taken place with adsorber 2, adsorber 1 is finally repressurized to adsorption pressure with product gas from adsorber 3. The adsorber 3, passing through the last part of its adsorption phase during this phase, discharges product gas to adsorber 1 via the opened valves 40, 41 and 14, pressurizing of adsorber 1 taking place countercurrently to the adsorption direction. After pressure equalization has been accomplished, the adsorber 1 has passed through a complete cycle and can again be switched to adsorption operation. Since pressure equalization between the adsorbers is usually accompanied by a slight pressure drop in the adsorber that is in an adsorption phase, the full adsorption pressure is not reached, either, when effecting pressure buildup with product gas. The small pressure difference up to full adsorption pressure is then abolished at the beginning of the adsorption phase by means of crude gas injected via valve 12.

In the adsorption installation illustrated in FIG. 1, a combined conduit 7 serves for pressure buildup, pressure equalization, and scavenging. However, it is readily possible to provide separate conduits for these differing process streams. Such a separation of the process streams requires, however, also additional valves besides the additional conduits and concomitantly an increased expenditure for regulating.

Figure 2:
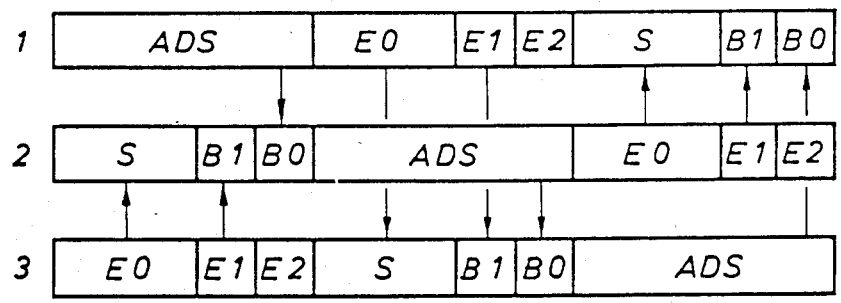
FIG. 2 shows a flow chart for the adsorption installation illustrated in FIG. 1.

FIG. 2 shows a and cycle for the operation of the adsorption installation shown in FIG. 1.

The bars 1, 2 and 3 represent the progression of the process steps in adsorbers 1, 2 and 3. At identical points in time, the three adsorbers are in the operating conditions that are vertically superimposed, the abbreviations employed having the following meanings:

| ADS | adsorption |
|---|---|
| E 0 | first cocurrent expansion (scavenging gas for S) |
| E 1 | second cocurrent expansion (gas for pressure buildup B 1) |
| E 2 | countercurrent expansion (residual gas) |
| S | scavenging (gas from E 0) |
| B 1 | pressure buildup in cocurrent mode (gas from E 1) |
| B 0 | pressure buildup in countercurrent mode (gas from ADS) |

The duration of a switching cycle can vary in the process of this invention. In general, such duration lies on the order of a few minutes, for example between 2 and 20 minutes. In extreme cases, however, the duration can also be even shorter or slightly longer.

Finally, the advantages of the process of this invention will be demonstrated with reference to a concrete practical example. This example refers to the production of oxygen from air by nitrogen adsorption on a zeolitic molecular sieve of the type 13 X. The air fractionation was conducted under an adsorption pressure of 3.8 bar and a desorption pressure of 1.0 bar and at a temperature of 295 K. The switching cycle lasted 3 minutes. An oxygen product stream consisting of 90% by volume of oxygen was discharged from the adsorption installation.

In a first embodiment of the process of this invention, differing from the process illustrated in the figures only in that pressure buildup B 0 took place countercurrently to the adsorption phase, the oxygen yield was 41%. In a second embodiment, corresponding to the process disclosed in the figures, i.e. where pressure buildup B 0 took place cocurrently to the adsorption direction, the oxygen yield was 45.6%. In contrast, oxygen yields of merely 31.6% could be attained by the process known from DOS No. 2,724,763, under otherwise identical process conditions.

Figure 3:
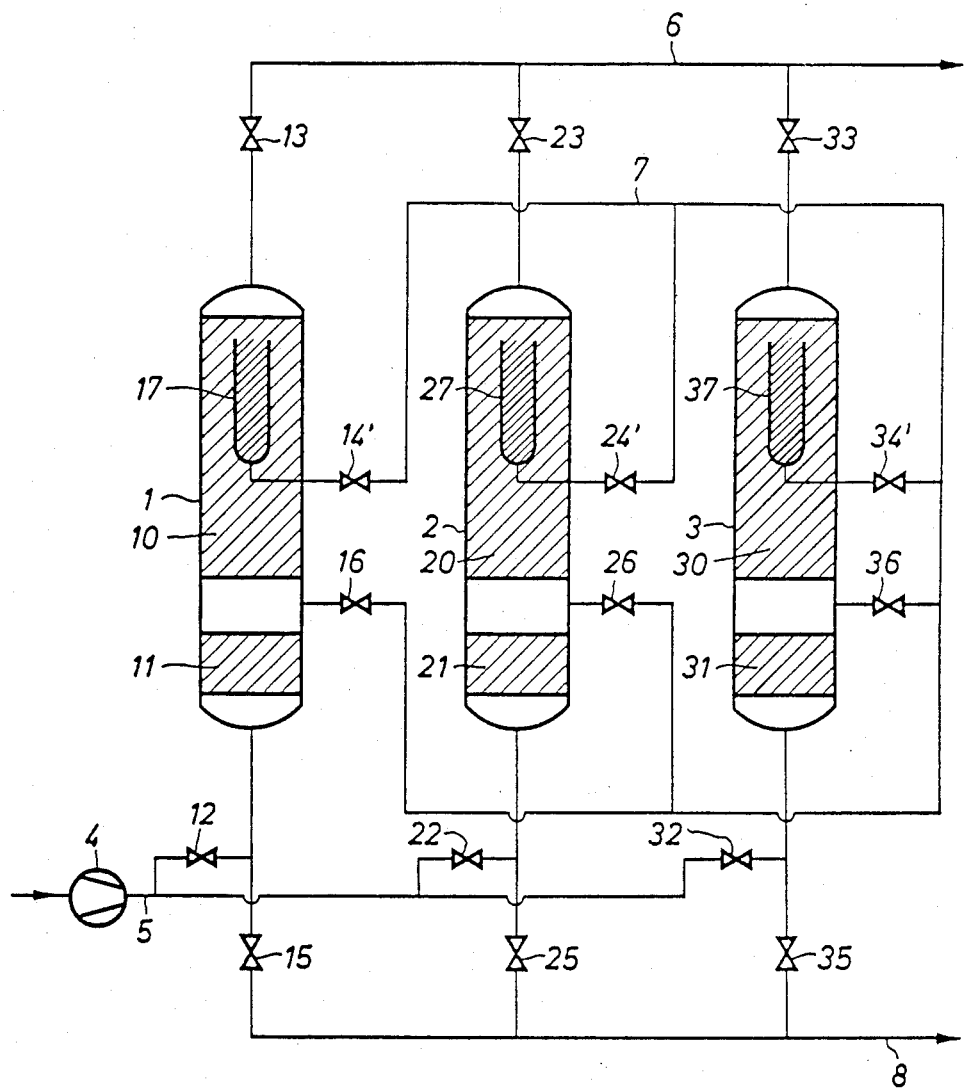
FIG. 3 shows an adsorption installation suited for conducting the process of this invention wherein the adsorbers of this invention are utilized.

The installation illustrated in FIG. 3 differs from that of FIG. 1 by the use of adsorbers according to this invention. However, the conductance of the process is the same and, again, is illustrated by the flow chart of FIG. 2. The following description addresses only the modifications as compared with the process of FIG. 1.

Within the adsorption beds 10, 20, 30 of adsorbers 1, 2 and 3, respectively, unilaterally open pipes 17, 27 and 37, respectively, are arranged which are filled with adsorbent and are in direct contact with the adsorption beds. The pipes can be installed in any desired way in the adsorber, for example by means of radially directed supporting plates attached to the inner wall of the adsorber vessel. The open end of the pipes is located in the proximity of the outlet end of the adsorber packing, while the closed end is oriented toward the gas inlet side and is disposed approximately in the middle of the adsorbent packing. From this closed end, a pipe conduit leads out of the adsorber, connected with 14', 24' and 34', respectively. The valves 14', 24' and 34', respectively, correspond to valves 14, 24 and 34, respectively, of FIG. 1.

The ordinary outlet ends of the adsorbers are in communication only with the product discharge conduit 6 by way of the conduits equipped with valves 13, 23 and 33, respectively.

During an adsorption phase of adsorber 1, the valves 12 and 13 are open. If, toward the end of the adsorption phase, a portion of the gas from adsorber 1 is to be utilized for pressurization B 0 of adsorber 2, then the valves 14' at adsorber 1 and 24' at adsorber 2 are additionally opened for this purpose. After termination of the adsorption phase, valves 12 and 13 are closed, and gas is no longer withdrawn from the adsorber outlet end until the beginning of the next adsorption phase. The cocurrent expansion phases E 0 and E 1 proceed with the valve 14' being open, scavenging gas being first conducted via conduit 7 and open valve 34' into adsorber 3 and then (during E 1) additional expansion gas being introduced into adsorber 3 via valve 14' and the then opened valve 36 for pressurizing purposes. The valves 16, 26 and 36, respectively, can also be arranged underneath the purifying beds 11, 21 and 31, respectively, whereby this pressurizing phase (B 1) takes place for both beds cocurrently to the adsorption direction.

After cocurrent expansion of adsorber 1 has taken place, valve 14' is closed and the countercurrent expansion phase E 2 is initiated as usual by opening valve 15. At the beginning of the scavenging phase S, valve 14' is again opened, and cocurrent expansion gas from adsorber 2 is conducted, via the likewise open valve 24', through adsorber 1. After completion of the scavenging phase, the valves 14' and 15 are closed, and additional expansion gas from adsorber 2 is conducted via the open valves 24' and 16 into adsorber 1. Finally, further pressurization to adsorption pressure takes place by means of oxygen withdrawn via the then opened valve 34' from adsorber 3 and being injected into adsorber 1 via conduit 7 and the opened valve 14'.

Adsorbers 2 and 3 are operated correspondingly.

It is understood that the installations shown schematically in FIGS. 1 and 3 are equipped with the conventional regulating mechanisms for pressure maintenance, valve switching, etc., as well-known to those skilled in the art.

We claim:

1. In a pressure swing adsorption process wherein a gaseous mixture under elevated pressure is conducted in cyclic alternation through only three adsorbent-filled adsorbers, with selective adsorption of at least one first component and formation of a product depleted in said first component, each adsorber passing through mutually chronologically shifted switching cycles, and each switching cycle comprising an adsorption phase at maximum process pressure, expansion phases conducted first cocurrently and then countercurrently to the adsorption direction, a desorption phase at minimum process pressure, and pressure buildup phases for restoring the adsorption pressure, and wherein pressure equalization takes place between an adsorber in a cocurrent expansion phase and an adsorber in a pressure buildup phase, the improvement which comprises the following sequential phases: after termination of the adsorption phase of (a) a first adsorber, a first cocurrent expansion phase with the thus-obtained expansion gas being utilized for scavenging a second adsorber which is in a desorption phase; (b) a second cocurrent expansion phase with the thus-obtained expansion gas is utilized for pressurizing the second adsorber; (c) a countercurrent expansion phase during which a residual gas is withdrawn from the inlet end of the first adsorber; (d) the desorption phase during which scavenging is carried out with a cocurrent expanion gas from the third adsorber; and (e) two pressure buildup phases of which the first takes place in pressure equalization with the third adsorber which is in the second cocurrent expansion phase, and the second takes place by introduction of product gas by way of the outlet end of the adsorber.

2. Process according to claim 1, wherein the cocurrent expansion gas is conducted during the first pressure buildup phase, to the inlet end of the adsorber to be pressurized.

3. Process according to claim 1 wherein the adsorption phase is conducted essentially at constant pressure.

4. Process according to claim 1, wherein the desorption phase at atmospheric pressure.

5. Process according to one of claims 1-4, wherein the flow cross section within an adsorber is reduced toward the adsorber outlet end.

6. Process according to claim 5, wherein the cross section is reduced by 10-80%.

7. A process according to claim 6 wherein the cross section is reduced over 20-80% of the adsorber length.

8. A process according to claim 7 wherein the flow cross section is reduced by means of a flow-displacing member from which expansion gasses are withdrawn or to which scavenging or pressurizing gases are supplied.

9. A process according to claim 6 wherein the cross section is reduced over 30-50% of the adsorber length.

10. Process according to claim 5 wherein the cross section is reduced over 20-80% of the adsorber length.

11. Process according to claim 5, wherein the flow cross section is reduced by means of a flow-displacing member from which expansion gases are withdrawn or to which scavenging gases or pressurizing gases, respectively, are supplied.

12. A process according to claim 5, wherein the cross section is reduced by 40-60%.

13. In an adsorber comprising a cylindrical vessel with a packing of adsorption material and with a gas inlet end as well as a gas outlet end at the opposed ends of the vessel, the improvement which comprises providing a displacement member filled with adsorbent in the zone of the gas outlet end, the displacement member being essentially axially aligned, open at its end oriented toward the gas outlet end of the vessel, and closed at its end oriented toward the gas inlet end of the vessel as well as being connected, at that location, with a conduit leading out of the vessel.

14. An adsorber according to claim 13, the displacement member comprises a unilaterally open pipe arranged concentrically to the vessel, the length of said pipe amounting to between 20% and 80% of the length of the adsorbent packing, the open end of said pipe having a distance from the outlet end of the adsorbent packing of between 5% and 30% of the length of the adsorbent packing, and the cross section of this pipe amounting to between 10% and 80% of the vessel cross section.

15. An adsorber according to claim 14 wherein the open end of said pipe is at a distance from the outlet end of the adsorbent packing of between 8% and 15% of the length of the adsorbent packing.

16. An adsorber according to claim 14 wherein the cross section of the pipe amounts to between 40 to 60% of the vessel cross section.

17. An adsorber according to claim 16 wherein the length of the pipe is 30-50% of the length of the adsorbent packing.

18. A pressure swing adsorption plant of three interconnected adsorbers, each being an adsorber defined according to claim 13, 14, 15, 16 or 17.

* * * * *

UNITED STATES PATENT AND TRADEMARK OFFICE
CERTIFICATE OF CORRECTION

PATENT NO. : 4,640,694

DATED : February 3, 1987

INVENTOR(S) : PAul Leitgeb et al

It is certified that error appears in the above-identified patent and that said Letters Patent is hereby corrected as shown below:

Column 9, Claim 4, Line 47:

reads: "tion phase at atmospheric pressure."

should read: --tion phase is conducted at atmospheric pressure.--

Column 10, Claim 8, Line 5:

reads: "member from which expansion gasses are withdrawn or"

should read: --member from which expansion gases are withdrawn or--

Column 10, Claim 14, Line 29:

reads: "An adsorber according to claim 13, the displace-"

should read: --An adsorber according to claim 13, wherein the displace---

Signed and Sealed this

Twenty-fifth Day of August, 1987

Attest:

DONALD J. QUIGG

Attesting Officer     Commissioner of Patents and Trademarks